(12) United States Patent
Beerlage et al.

(10) Patent No.: US 6,490,862 B1
(45) Date of Patent: Dec. 10, 2002

(54) PREPARATION OF WATER FROM FLUE GASES

(75) Inventors: Monique A. M. Beerlage, Duiven (NL); André G. L. Zeijseink, Loenen (NL)

(73) Assignee: N.V. Kema, Arnhem (NL)

( * ) Notice: Subject to any disclaimer, the term of this patent is extended or adjusted under 35 U.S.C. 154(b) by 0 days.

(21) Appl. No.: 09/936,997

(22) PCT Filed: Mar. 22, 2000

(86) PCT No.: PCT/NL00/00191

§ 371 (c)(1),
(2), (4) Date: Dec. 20, 2001

(87) PCT Pub. No.: WO00/56426

PCT Pub. Date: Sep. 28, 2000

(30) Foreign Application Priority Data

Mar. 22, 1999 (NL) .............................. 1011626

(51) Int. Cl.[7] .................................................. F01K 1/00
(52) U.S. Cl. .............................. 60/670; 60/39.6; 60/659
(58) Field of Search .......................... 60/39.6, 670, 659

(56) References Cited

U.S. PATENT DOCUMENTS 4,725,359 A * 2/1988 Ray .......................... 210/640
5,051,188 A * 9/1991 Spiske et al. ................ 210/640
5,110,476 A * 5/1992 Taylor .......................... 210/640

FOREIGN PATENT DOCUMENTS

| DE | 41 32 916 A | 4/1993 |
| DE | 42 41 891 A | 6/1994 |
| EP | 0 192 893 A | 9/1986 |
| EP | 0 599 149 A | 6/1994 |

* cited by examiner

Primary Examiner—Hoang Nguyen
(74) Attorney, Agent, or Firm—Banner & Witcoff, Ltd.

(57) ABSTRACT

An apparatus for preparing water from water-containing gases released in a conversion device for converting chemical energy into mechanical energy, comprising: at least one membrane which is adapted to at least partly allow passage of water molecules and substantially prevent passage of other molecules; a passage for guiding the waste gases along a first side of the membrane, a discharge pipe arranged on the second side of the membrane for discharging the water released on the second side of the membrane. The conversion device for converting chemical energy into mechanical energy is formed by a conversion device with external combustion, and the discharge pipe are formed at least partly by auxiliary equipment associated with the conversion device with external combustion.

7 Claims, 1 Drawing Sheet

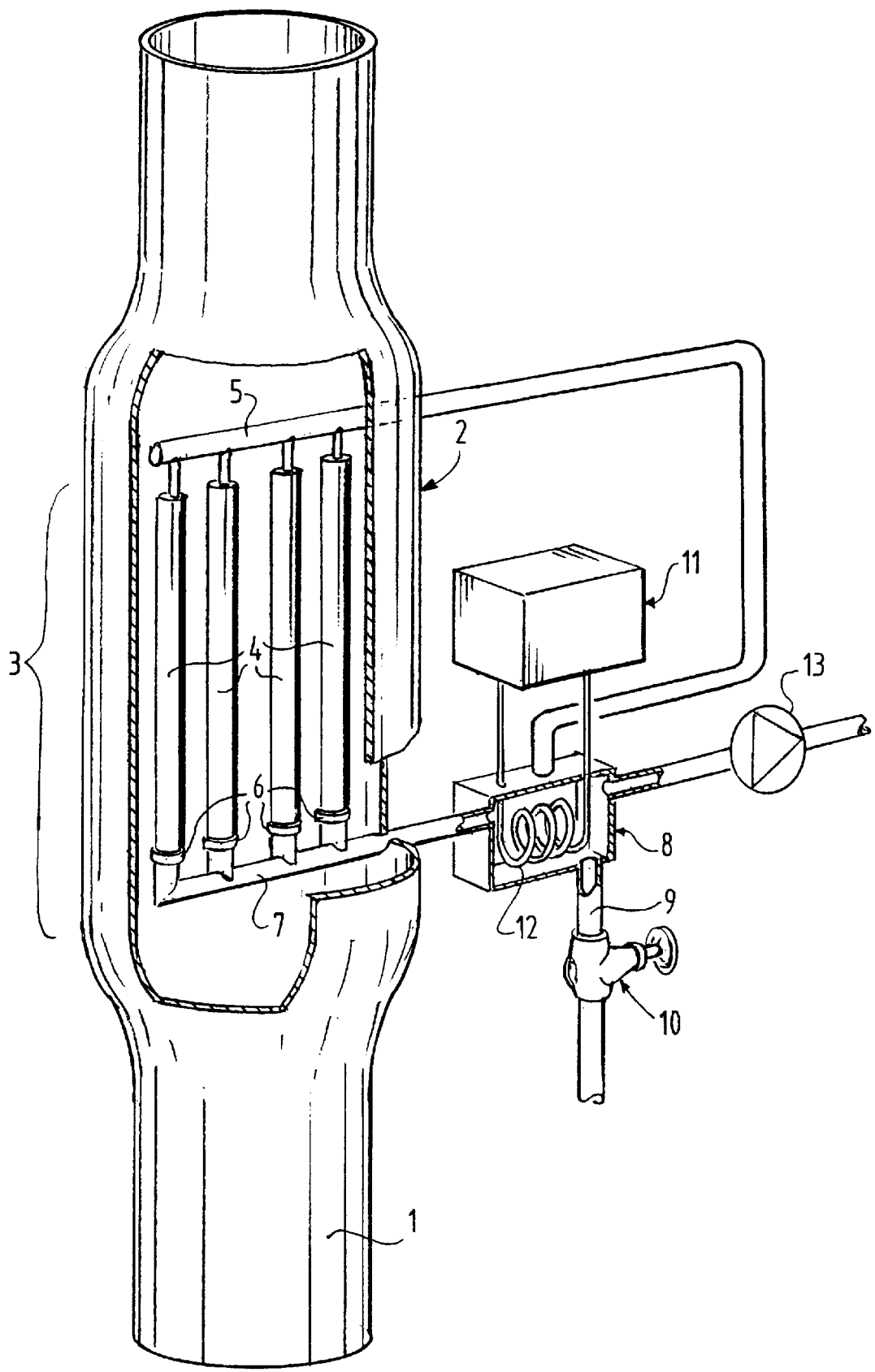

PREPARATION OF WATER FROM FLUE GASES

The present invention relates to the preparation of low-salt, low-TOC and perhaps low-gas water, in particular water of high quality.

In a large number of countries in the world there exists a shortage of potable water. This is particularly the case in dry regions and in regions where the infrastructure for careful preparation and transport of potable water is inadequate.

It is therefore generally important to manage potable water as economically as possible and to utilize possible potable water sources as well as possible.

The currently most used sources of potable water are groundwater, spring water and surface water which, after purification, can be used as potable water. In some cases rainwater is also used.

The object of the present invention is to provide means for the preparation of water from sources which until now have not been used. The attempt is hereby made to provide water of a high purity which can be used directly as boiler feed water or for other technical applications. The usual sources of potable water need hereby no longer be drawn upon for this use.

The attempt is further made to provide such a apparatus wherein efforts in respect of investment, energy consumption and other effort are minimal.

Known from EP-A-O 192 893 is a preparation apparatus for preparing water from water-containing gases released in a device for converting chemical energy into mechanical energy, wherein the preparation apparatus comprises:
- at least one membrane which is adapted to at least partly allow passage of water molecules and substantially prevent passage of other molecules;
- means for guiding the gases containing water vapour along a first side of the membrane,
- discharge means arranged on the second side of the membrane for discharging the water released on the second side of the membrane.

This prior art publication relates to a conversion device with internal combustion. Such devices are used in large numbers in the form of combustion engines, both stationary and mobile. Heavy and bulky auxiliary equipment is required to prepare water from the exhaust gases of such a motor. A vacuum pump must thus be used to maintain a sufficiently low pressure on the second side of the membrane and a condenser must be used to allow a sufficiently low temperature to prevail on the second side of the membrane.

These are costly, heavy and bulky apparatuses which it is hardly possible to accommodate in a vehicle, certainly when provisions must be made for storage of the prepared water. This is already in no way proportional with the thus obtained yield of water. These drawbacks are also relevant in respect of stationary engines.

The object of the invention is to provide an application of such a preparation apparatus in a situation in which these drawbacks do not occur.

This object is achieved by such a preparation apparatus which is characterized in that the conversion device for converting chemical energy into mechanical energy is formed by a conversion device with external combustion, and in that the discharge means are formed at least partly by auxiliary equipment associated with the conversion device with external combustion.

These measures enable the use of the auxiliary equipment required in a conversion device for chemical energy to mechanical energy with external combustion. The external combustion supposes a Carnot cycle through which an auxiliary medium must progress as energy carrier. The progression through a Carnot cycle requires the presence of a condenser. A pump is usually present to cause an underpressure to prevail in the condenser.

The measures according to the invention enable the fruitful use of these facilities, so that these per se bulky appliances do not have to be placed separately.

It is thus possible to use a heretofore unused source of water of a high quality, i.e. gases containing water vapour, such as the waste gases of an energy conversion device. It is noted here that in the presently proposed use the prepared water is used as boiler feed water or as water for other industrial applications. This is the consequence of the high purity of the water attainable with the apparatus according to the invention. It is conceivable to use the water as potable water, i.e. after the addition of substances normally present in potable water, or by using membranes which allow through the substances in question.

According to a first embodiment the conversion device forms part of an electric power station.

A conversion device of exceptionally large dimensions is present here with a high rate of water-containing gas flows. The auxiliary equipment is moreover of corresponding dimensions, so that the additional load by the flow of the water preparation according to the invention has no or hardly any effect on the dimensioning of the auxiliary equipment. It is usually even possible to use this auxiliary equipment without modifications, so that it is easy to arrange such a water preparation apparatus in an existing power station.

In view of the exceptionally large quantities of flue gases which are produced by an electric power station, it is particularly attractive to use the flue gases as a source of water. As stated above, this results in large saving.

According to another embodiment the auxiliary equipment comprises a condenser and the discharge means re formed at least partly by the condenser associated with the auxiliary equipment.

According to a further embodiment the condenser is connected to a pump for maintaining a pressure in the condenser which is lower than the ambient pressure.

These measures also result in an effective use of components already present.

According to another preferred embodiment the membrane is only suitable for allowing through water molecules in vapour form. This has the consequence that on the discharge side of the membrane only water becomes available which has been in vapour phase, thus precluding the presence of substances dissolved or otherwise present in the water.

According to yet another preferred embodiment the membrane is formed into a number of substantially cylinder surface-shaped units, wherein the axes of each of the cylinder surfaces extend mutually parallel, and wherein at least one end of the cylinders is connected to a collecting tank forming part of the discharge means.

It will be apparent that in a large-scale application of the present invention, where the object is of course to achieve sufficient water output, the membrane will have to have as large a surface area as possible. It has been found that with the above stated measures a large surface area of the membrane can be realized within a relatively small volume, but wherein the dimensioning has yet to be determined. This in any case depends on the properties of the membrane, the thickness thereof, the flow rate of the gas from which the water must be extracted, pressures, temperatures and so on.

It is also possible in principle to apply other configurations of the membrane, such as a membrane in the form of a plate, a spiral and so on.

According to a preferred embodiment the substantially cylinder surface-shaped units are manufactured from hollow tubes or fibres of the membrane or from capillaries.

The initial processing of the membrane material into tubes or fibres makes it particularly possible to manufacture the above stated structure.

Another preferred embodiment teaches that the substantially cylinder surface-shaped units are placed with a vertical axis in a substantially vertically extending flue gas duct.

The advantages of the above stated configurations are hereby combined.

It is otherwise also possible to fold the axis of the cylinder surfaces horizontally.

When the apparatus is applied in a flue gas discharge duct of an incineration plant provided with a flue gas desulphurizing installation operating with water, the apparatus is preferably placed downstream of the flue gas desulphurizing installation.

Flue gas desulphurizing installations generally operate with large quantities of water, a part of which remains in the flue gases saturated with water vapour to be further released to the atmosphere. It is therefore important to place the apparatus according to the invention downstream of the flue gas desulphurizing installation in order to also enable recovery of the water fed into the flue gas desulphurizing installation.

It is also possible for the cooling means to be adapted to maintain a temperature below the dew point of water in the collecting tank.

Another measure teaches that the means for maintaining a low temperature on the second side of the membrane are adapted to make effective use of the heat released on the second side of the membrane. The efficiency of an electric power station can hereby be improved slightly.

A further improvement in efficiency is possible in that the water content of the flue gases is decreased. The danger of condensation occurring is also reduced. The need for additional heating of the flue gases before they are carried to the chimney in order to prevent condensation is hereby reduced.

An electric power plant not only produces water but also consumes considerable quantities of water as boiler feed water. The boiler feed water comes for the greater part from the condenser, so that a circulation is obtained. The circulation is however not completely closed, since water loss does occur. This water loss can be easily compensated with a apparatus according to the invention. A considerable saving of potable water is obtained herewith, since the boiler make-up water must be of high quality and pre-treated potable water or spring water, groundwater or surface water is normally used.

The present invention will now be further elucidated with reference to the accompanying FIGURE, in which:

FIG. 1 shows a schematic view of a flue gas duct in which an embodiment according to the present invention is applied.

FIG. 2 shows a diagram of a power station into which the invention is integrated.

FIG. 1 shows a flue gas duct 1 is shown which is provided with a widened portion 2. The apparatus according to the present invention designated in its entirety with 3 is arranged in widened portion 2. The widened portion 2 serves to maintain a sufficient passage despite the arrangement of apparatus 3.

It is otherwise also possible to place the apparatus in a non-widened flue gas duct; this applies particularly if the apparatus is placed in an existing chimney.

The actual apparatus is formed by a number of pipes 4 manufactures from membrane material which are suspended in vertical direction from a manifold 5. The hoses are connected on their upper side to the inside of manifold 5 which is connected to a tank 8. On their underside the hoses are connected by means of a clamping ring 6 or other connection to a manifold 7 which is also connected to tank 8. Although manifolds 5, 7 are only shown in one dimension, it will be apparent that they will generally take a two-dimensional form.

Connected to tank 8 is a discharge pipe 9 in which is arranged a valve 10. Use is further made of a cooling device 11 which is already present per se in a power station and the cooling spiral 12 of which extends into tank 8, and tank 8 is connected to a vacuum pump 13.

The operation of this apparatus will now be described.

As the flue gases move through duct 1, the water vapour present in the flue gases will pass through the membrane received in hoses 4. It then enters the interior of hoses 4 and subsequently flows through manifold 7 into tank 8. The tank can be drained as required by means of valve 10.

In order to enhance the transport through the membrane use is made of a vacuum pump 13 which decreases the vacuum and thereby also the partial water pressure inside tank 8.

To cool the contents of tank 8 use is made of a cooling device 11. This also improves the transport through the membrane wall.

It will be apparent that the cooler according to the above embodiment is formed by a condenser of a device for converting chemical energy into mechanical energy. Other components can also form part of the normal infrastructure of an electricity power station.

This possibility moreover provides the option of creating a circulating gas flow, whereby the vapour pressure inside the hoses can be maintained more easily at a lower level. In this circulating gas flow use can be made of a "sweep gas", which is formed for instance, but not necessarily, by nitrogen. The flushing gas reduces the concentration of water molecules on the rear side of the membrane, whereby the transport of water molecules is enhanced.

It is otherwise also possible to apply membranes in configurations other than tube or pipe-shaped configurations. It is thus possible for instance to place the membranes in substantially flat planes. The flow of waste gases is preferably guided parallel along the plane so as to make the contact time as long as possible. The membrane can further be provided with ribs and folds in order to make the surface area as large as possible. Numerous other configurations can also be envisaged.

The advantages of the invention are particularly manifest when the preparation apparatus is integrated into an electrical power station.

The electrical power station comprises a boiler and a discharge duct for flue gases connecting thereto. A membrane is placed in this discharge duct, which also includes the chimney, together with optional flue gas desulphurizing installations. A membrane is understood to mean all conceivable combinations and configurations of membranes which are suitable for the invention.

Boiler is further incorporated in a circuit for performing a Carnot cycle, which circuit is provided with a turbine, a condenser and a pump. A pump is arranged to maintain a sufficiently low pressure in the condenser. Such a circuit is generally applied in electrical power stations. According to the invention use can advantageously be made of condenser and vacuum pump. Both these elements are used to maintain the desired conditions on the outlet side of the membrane. It is possible also, or alternatively, to apply other elements already present in the electrical power station, such as pumps and the like.

Numerous other possibilities are also present by way of modification of this proposal. For instance by placing the cylinder surface-shaped bodies in a ring along the periphery of a flue gas duct.

Another field of application is in cooling towers such as are used in electrical power stations. Water coming from the cooling circuit of the power station is herein cooled before it is fed to the surface water. For this purpose the water for cooling is sprayed. A significant part of this sprayed water will evaporate. The evaporation energy originates from the remaining water which will cool.

The water vapour rises inside the cooling tower and will exit to the atmosphere. This is a considerable quantity of water which—normally—is lost for further effective use.

By placing a apparatus according to the invention in the cooling tower at least a significant part of the evaporated water can be recovered and be used for effective purposes.

In question here are enormous quantities of water which, using the apparatus according to the invention, become available without use of energy. Opposed to this there is of course the investment required for the invention.

In the application in question use can be made of a configuration as is applied in the case of flue gas ducts, albeit with a much larger diameter, although it is also possible to make use of other configurations.

Use can also be made here of the components present in the infrastructure of an electrical power station, such as a condenser and a vacuum pump for generating conditions for enhancing operation of the membrane.

In addition, the application of the above stated principle is also deemed possible on a smaller scale, for instance in dwellings. It is herein possible to make use of decentralized generation of energy, for instance in warm countries with little water. Use is usually made herein of air-conditioning systems wherein energy conversion is necessary. Heating systems can also make fruitful use of such an apparatus according to the invention.

The invention is otherwise not limited to the above described applications; it can for instance also be applied in the chemical industry and the processing industry; the presence of a conversion device with external combustion and the presence of flows of water-containing gases are important.

What is claimed is:

1. A preparation apparatus for preparing water from water-containing gases wherein said gases are released from a conversion device with external combustion for converting chemical energy into mechanical energy, and wherein the conversion device comprises a condenser and a pump for maintaining pressure inside the condenser which is lower than the ambient pressure, said apparatus comprising:

at least one membrane which is adapted to at least partly allow passage of water molecules and substantially prevent passage of other molecules;

guiding means for guiding the water-containing gases along a first side of the membrane; and discharge means arranged on the second side of the membrane for discharging the water released on the second side of the membrane, wherein, the apparatus is used for preparing water from water-containing gases released from said conversion device, and the discharge means include the condenser and the pump.

2. An apparatus as claimed in claim 1, characterized in that the preparation apparatus is used for preparing water from water-containing gases released by a power station.

3. An apparatus as claimed in claim 1, characterized in that the membrane is only suitable for allowing the passage of water molecules in vapour form.

4. An apparatus as claimed in claim 2, characterized in that a flue gas desulphurizing installation operating with water is located in the guiding means and that the apparatus is located downstream from the flue gas desulphurizing installation.

5. An apparatus as claimed in claim 1, characterized in that the installation is placed in a cooling tower of an electric power station.

6. An apparatus as claimed in claim 5, characterized in that the apparatus is placed directly above a spraying device present in the cooling tower.

7. An apparatus as claimed in claim 2, characterized in that the membrane is only suitable for allowing the passage of water molecules in vapour form.

* * * * *